United States Patent
Osumi

(10) Patent No.: US 10,616,758 B2
(45) Date of Patent: *Apr. 7, 2020

(54) SERVER DEVICE, METHOD OF PROCESSING MASKING OF ROUTE INFORMATION AND PROGRAM FOR THE METHOD

(71) Applicant: TOYOTA JIDOSHA KABUSHIKI KAISHA, Toyota-shi, Aichi-ken (JP)

(72) Inventor: Ryota Osumi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,577

(22) Filed: Oct. 11, 2018

(65) Prior Publication Data

US 2019/0116492 A1 Apr. 18, 2019

(30) Foreign Application Priority Data

Oct. 12, 2017 (JP) .................................. 2017-198645

(51) Int. Cl.
*H04W 12/02* (2009.01)
*H04W 4/02* (2018.01)
(Continued)

(52) U.S. Cl.
CPC ............ *H04W 12/02* (2013.01); *G01C 21/00* (2013.01); *H04W 4/027* (2013.01); *H04W 4/029* (2018.02)

(58) Field of Classification Search
CPC .............. G01C 21/3423; G01C 21/367; G01C 21/3667; G01C 21/3676; G01C 21/00;
(Continued)

(56) References Cited

U.S. PATENT DOCUMENTS

2011/0066364 A1* 3/2011 Hale .................. G01C 21/3423
701/533
2011/0077853 A1* 3/2011 Ranford ............. G01C 21/3423
701/533
(Continued)

FOREIGN PATENT DOCUMENTS

JP 2015-103025 A 6/2015

OTHER PUBLICATIONS

United States Patent and Trademark Office, Non-Final Office Action issued to U.S. Appl. No. 16/157,555 dated Apr. 8, 2019, 16 pages.
(Continued)

*Primary Examiner* — Nizar N Sivji
(74) *Attorney, Agent, or Firm* — Hunton Andrews Kurth LLP

(57) ABSTRACT

In a server device, an acquisition unit acquires positional information on a communication terminal. An extraction unit extracts route information including a start point and an end point from the positional information. An identification unit identifies a type of a means of movement of the communication terminal based on the positional information. A masking unit masks a segment of the route information including the start point and a segment including the end point to generate output route information. The masking unit defines a masked segment of the route information in accordance with a type of the means of movement.

4 Claims, 7 Drawing Sheets

(51) Int. Cl.
*H04W 4/029* (2018.01)
*G01C 21/00* (2006.01)

(58) Field of Classification Search
CPC ............ G01C 21/3415; G01C 21/3476; G08G 1/166; G08G 1/20; H04W 4/02; H04W 4/40; H04W 4/046; H04W 4/025; H04W 4/029; H04W 12/02; H04W 4/027; G05D 2201/0212
See application file for complete search history.

(56) References Cited

U.S. PATENT DOCUMENTS

| | | | | |
|---|---|---|---|---|
| 2014/0365113 | A1* | 12/2014 | McGavran | G01C 21/00 701/425 |
| 2014/0365120 | A1* | 12/2014 | Vulcano | G01C 21/36 701/532 |
| 2015/0177013 | A1* | 6/2015 | Siliski | G01C 21/3423 701/433 |
| 2016/0290818 | A1* | 10/2016 | Kim | G01C 21/3423 |
| 2016/0349063 | A1* | 12/2016 | Maurer | G08G 1/096833 |
| 2017/0010118 | A1* | 1/2017 | Hajj | G01C 21/3492 |
| 2017/0146352 | A1* | 5/2017 | Michaels | G01C 21/26 |
| 2017/0205885 | A1* | 7/2017 | Schpok | G01C 21/26 |
| 2017/0358113 | A1* | 12/2017 | Bray | G06F 3/0482 |
| 2017/0370736 | A1* | 12/2017 | Singh | G01C 21/3415 |
| 2018/0038710 | A1* | 2/2018 | Shang | G01C 21/26 |
| 2018/0043976 | A1* | 2/2018 | Nakamoto | B63B 49/00 |
| 2018/0088795 | A1* | 3/2018 | van Os | G06F 3/04883 |
| 2018/0299280 | A1* | 10/2018 | Kumar | G01C 21/3484 |
| 2019/0033092 | A1* | 1/2019 | Yang | G01C 21/34 |
| 2019/0033093 | A1* | 1/2019 | Chao | G01C 21/34 |
| 2019/0113597 | A1 | 4/2019 | Osumi | |

OTHER PUBLICATIONS

United States Patent and Trademark Office, Final Office Action issued to U.S. Appl. No. 16/157,555 dated Aug. 15, 2019, 13 pages.
United States Patent and Trademark Office, Notice of Allowance issued to U.S. Appl. No. 16/157,555 dated Nov. 26, 2019, 11 pages.

* cited by examiner

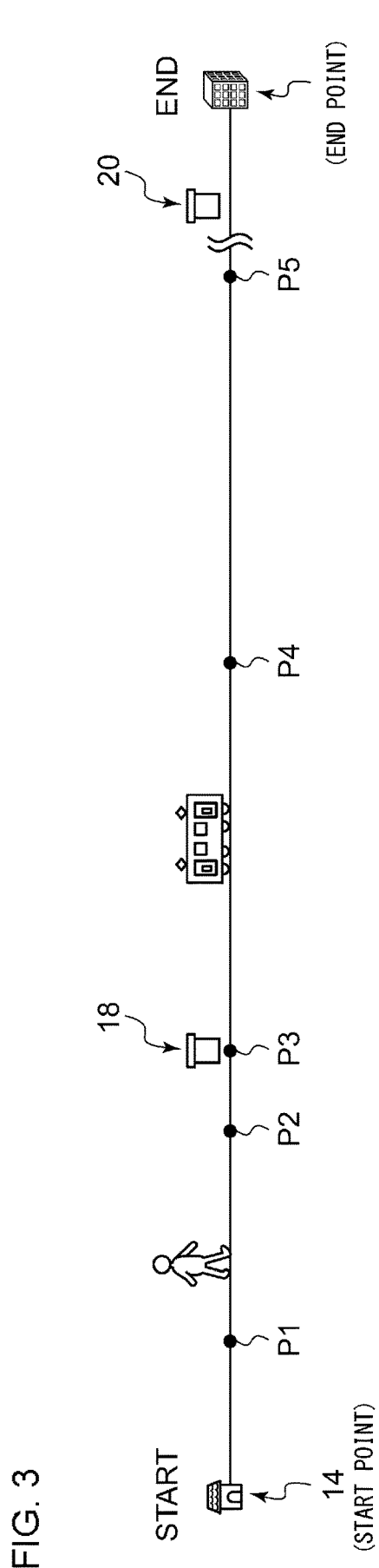

SERVER DEVICE, METHOD OF PROCESSING MASKING OF ROUTE INFORMATION AND PROGRAM FOR THE METHOD

The disclosure of Japanese Patent Application No. 2017-198645 filed on Oct. 12, 2017 including the specification, drawings and abstract is incorporated herein by reference in its entirety.

BACKGROUND OF THE INVENTION

1. Field of the Invention

The disclosure relates to a server device that acquires positional information on a communication terminal, a method of processing masking of route information of a communication terminal, and a program for the method.

2. Description of the Related Art

Recently, terminals equipped with a Global Positioning System (GPS) and provided with communication functions such as smartphones and car navigation systems have been used widely. The positional information on these terminals acquired from the terminals are not only used in a variety of services such as route guidance for individuals carrying the terminals but also are beginning to be exploited as big data that represent the movement trend or degree of congestion of people or automobiles. Meanwhile, the positional information on individuals or automobiles could include personal information or information pertaining to privacy. It is therefore necessary to consider a support for personal information protection or privacy protection in dealing with the positional information.

Patent document 1 discloses a technology of hiding the route information to prevent individuals related to the collected positional information from being identified, whereby positions distanced from a place of departure and a place of arrival of the route by a predetermined distance are determined to be a start point and an end point, respectively, and the route between the start point and the end point is output as output route information.

[patent document 1] JP-A-2015-103025

While it is possible to prevent individuals related to a movement history from being identified by masking the place of departure and the place of arrival in the movement history, an extensive masking range lowers the usefulness of the data. It is therefore preferred to define the masking range safely while at the same time ensuring the usefulness. Of particular note, mobile terminals such as smartphones make it possible to collect a history of the owner's movement by walking and movement using automobiles and public transportation. The speed of the means of movement varies significantly so that it would be difficult to address the needs of safety and usefulness at the same time if the data are masked in the same condition.

SUMMARY OF THE INVENTION

The embodiments address this background and a general purpose thereof is to provide a technology to inhibit the usefulness of the data from being lowered while at the same time securing the difficulty of identifying an individual from the route information.

A server device according to an embodiment includes: an acquisition unit configured to acquire positional information on a communication terminal; an extraction unit configured to extract route information including a start point and an end point from the positional information; an identification unit configured to identify a type of a means of movement of the communication terminal based on the positional information; and a masking unit configured to mask a segment of the route information including the start point and a segment including the end point to generate output route information. The masking unit defines a masked segment of the route information in accordance with a type of the means of movement.

According to this embodiment, the usefulness is inhibited from being lowered while at the same time the difficulty of identifying an individual is secured, by defining a masked segment in accordance with a type of a means of movement.

The identification unit may identify a temporary stop point between the start point and the end point where the communication terminal stops temporarily and identify the type of the means of movement for each of segments derived from dividing a route between the start point and the end point by the temporary stop point. This makes it possible to identify the means of movement of the communication terminal precisely.

The identification unit may identify whether the means of movement of the communication terminal is walking or transportation, and the masking unit may define a masked segment of the route information by defining a traveling time of the communication terminal and configure the traveling time of the communication terminal masked when the means of movement is identified to be walking to be longer than the traveling time of the communication terminal masked when the means of movement is identified to be transportation. In the case the means of movement is walking, the movement is slower than the case of transportation. Therefore, too short a masked time may make it difficult to secure the anonymity. By defining the masked time to be longer than the case of transportation, therefore, the anonymity can be secured.

The identification unit may identify whether the means of movement of the communication terminal is walking or transportation, and the masking unit may define a masked segment of the route information by defining a traveling distance of the communication terminal and configure the traveling distance of the communication terminal masked when the means of movement is identified to be transportation to be longer than the traveling distance of the communication terminal masked when the means of movement is identified to be walking. By causing the masking unit to define a longer distance in the case the means of movement is transportation, the anonymity is enhanced.

When the means of movement is changed from a first means of movement to a second means of movement in a second masked segment, which is shorter than a first masked segment masked when the only means of movement is the first means of movement, the masking unit may convert a difference between the first segment and the second segment in accordance with the second means of movement to define a third segment and mask a totality of the second segment and the third segment. In the case the means of movement of the communication terminal is changed in the masked segment, a balance is established between the usefulness of the data and the anonymity, by deriving masked segments appropriate for the respective means of movement and masking the totality of the masked segments.

Another embodiment relates to a method of processing masking of route information. The method includes: extracting route information including a start point and an end point from positional information on a communication terminal; identifying a type of a means of movement of the communication terminal based on the positional information; and masking a segment of the route information including the start point and a segment including the end point to generate output route information. The segment of the route information masked in the masking is defined in accordance with a type of the means of movement.

Still another embodiment relates to a program. The program includes computer-implemented modules including: an extracting module that extracts route information including a start point and an end point from positional information on a communication terminal; an identifying module that identifies a type of a means of movement of the communication terminal based on the positional information; and a masking module that masks a segment of the route information including the start point and a segment including the end point to generate output route information. The segment of the route information masked in the masking module is defined in accordance with a type of the means of movement.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a drawing to illustrate a method of identifying the means of movement by the identification unit;

DETAILED DESCRIPTION OF THE INVENTION

The invention will now be described by reference to the preferred embodiments. This does not intend to limit the scope of the present invention, but to exemplify the invention.

Figure 1:
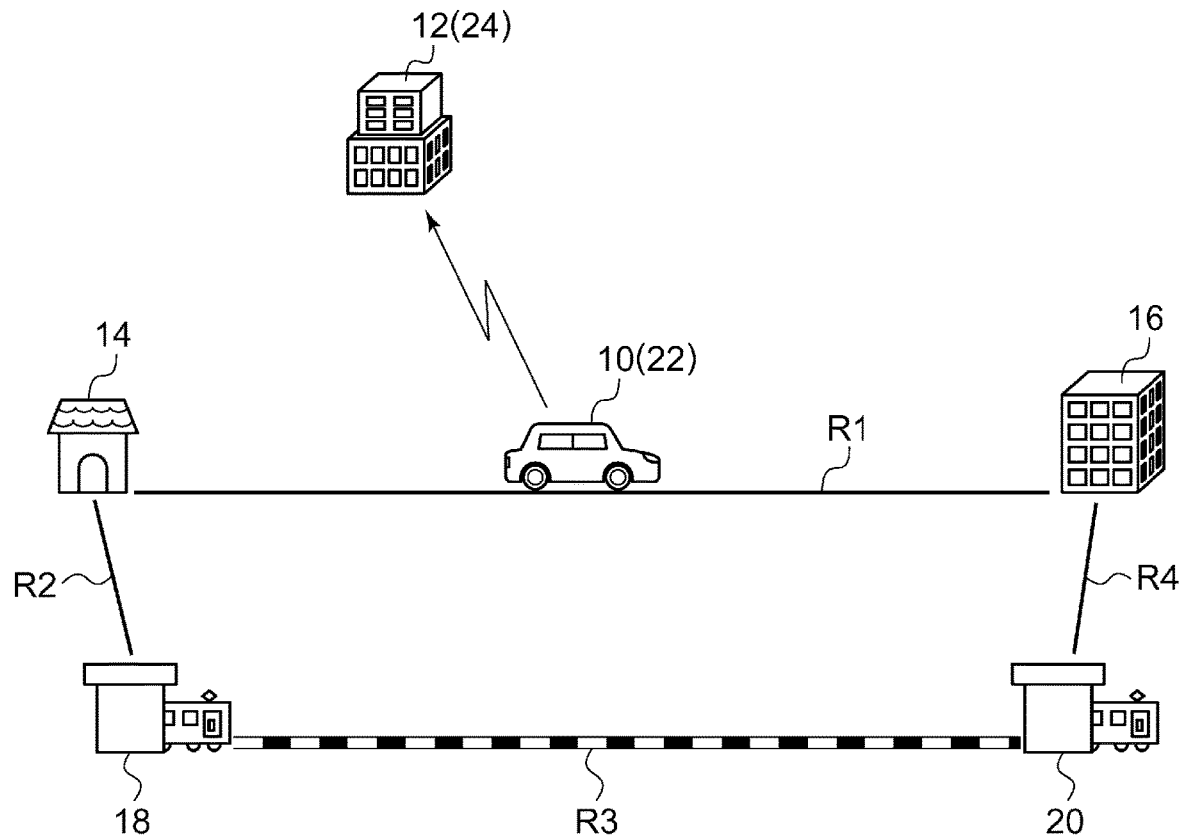
FIG. 1 is a drawing to illustrate a system in which a server device of the embodiment collects route information of a client.

FIG. 1 is a drawing to illustrate a system in which a server device of the embodiment collects route information of a client. A communication terminal 22 on a vehicle 10 may be a mobile device of the user on board the vehicle. The positional information on the communication terminal 2 is periodically acquired by using the GPS. For example, the positional information may be acquired every several seconds.

The positional information and time information on the communication terminal 22 are transmitted from the communication terminal 22 on the vehicle 10 to a server device 24 in a data center 12 at a predetermined transmission period. The time information indicates the time that the positional information is acquired. The predetermined transmission period may be set appropriately within a range from several seconds to several days. In an alternative example, the positional information and time information on the communication terminal 22 may be transmitted in each trip of the vehicle. The communication terminal 22 may transmit the positional information to the server device 24 every time the communication terminal 22 acquires the positional information. Alternatively, the communication terminal 22 may transmit a collection of positional information stored to the server device 24.

The server device 24 located in the data center 12 acquires the positional information and time information on the communication terminal 22 from the communication terminal 22 via a network. The server device 24 derives route information indicating a route that the user carrying the communication terminal 22 travels, based on the positional information and time information on the communication terminal 22. The route information includes positional information on a start point and an end point.

The server device 24 collects the route information by acquiring the positional information from the communication terminals 22 of a plurality of users. The collected information is used as so-called big data for traffic analysis, sightseeing trend analysis, etc. For example, the route information on all users living in the same city may be analyzed to predict the occurrence of traffic congestion.

FIG. 1 shows that the user carrying the communication terminal 22 travels from a home 14 to a place of work 16 on a route R1 by using the vehicle 10. Alternatively, the user may move on a route R2 from the home 14 to a station 18 nearest the home by walking, move on a route R3 from the station 18 nearest the home to a station 20 nearest the place of work on a train that is a form of transportation, and move on a route R4 from the station 20 nearest the place of work to the place of work 16 by walking. When the user moves via the routes R2 through R4, the means of movement is a combination of walking and transportation.

Figure 2:
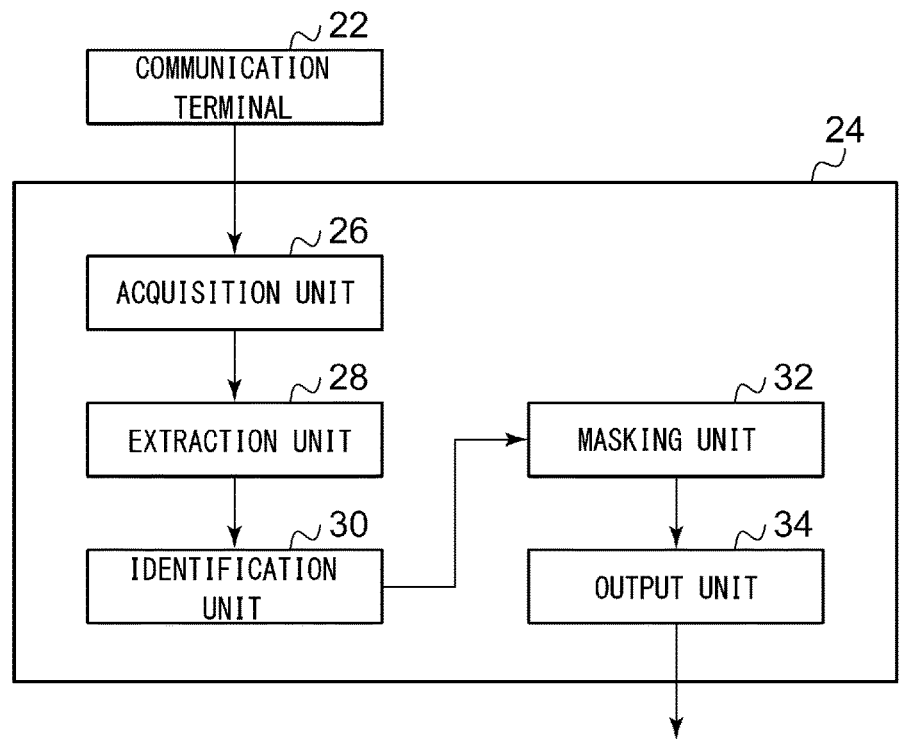
FIG. 2 is a drawing to illustrate functions and a configuration of the server device.

FIG. 2 is a drawing to illustrate functions and a configuration of the server device 24. The elements depicted in FIG. 2 as functional blocks for performing various processes are implemented by hardware such as a circuit block, a memory, or other LSI's, and by software such as a program etc., loaded into the memory. Therefore, it will be understood by those skilled in the art that the functional blocks may be implemented in a variety of manners by hardware only, software only, or a combination of thereof, and the implementation is not limited to any particular form.

The server device 24 includes an acquisition unit 26, an extraction unit 28, an identification unit 30, a masking unit, and an output unit 34. The acquisition unit 26 acquires a plurality of pieces of positional information and time information from the communication terminal 22.

The extraction unit 28 extracts the route information on the communication terminal 22 including the information on the start point and the end point, based on the positional information and time information on the communication terminal 22. The extraction unit 28 identifies a staying point where the communication terminal 22 stays for a predetermined staying time or longer by referring to the positional information acquired in a time series. The staying point may be an area of a certain range, and the extraction unit 28 identifies a staying point by detecting that the communication terminal 22 stays for the predetermined staying time or longer in a certain area. The identified staying point forms the start point or the end point in the route information. In other words, the identified staying point forms a route end point in relation to a staying point identified earlier in time and forms a route start point in relation to a staying point identified later in time.

When the positional information and time information on the communication terminal 22 indicate that the communication terminal 22 stays for 20 minutes or longer within a range of a radius of 50 meters, for example, the extraction unit 28 identifies that point as a staying point. Thus, the extraction unit 28 identifies staying points and determines staying points adjacent in time as the start point and the end point of the route information, respectively, thereby extracting the route information on the communication terminal 22.

The identification unit 30 identifies the type of the means of movement of the communication terminal 22 based on the positional information and time information on the communication terminal 22. In the embodiment, the means of movement is grouped into two types including walking and transportation. Alternatively, the means of movement may be grouped into three types including walking, bicycle, and high-speed movable body such as a vehicle.

The identification unit 30 calculates a moving speed of the communication terminal 22 from the positional information and time information on the communication terminal 22 and identifies the type of means of movement of the communication terminal 22 based on the moving speed of the communication terminal 22. The identification unit 30 identifies the means of movement to be transportation when the means of movement is advancing at a speed equal to or more than a predetermined reference speed (e.g., 20 kilometers per hour) and identifies the means of movement to be walking when the means of movement is advancing at a speed equal to or less than 20 kilometers per hour.

In order to prevent the means of movement from being misunderstood to be walking when the means of movement is actually a vehicle and the vehicle stops temporarily at a signal, etc., it is preferred that the identification unit 30 divides a route between the start point and the end point into segments and identifies the means of movement by determining whether the moving speed of the communication terminal 22 exceeds the reference speed for each segment. The method of identifying the means of movement by the identification unit 30 will be described with reference to FIG. 3.

FIG. 3 is a drawing to illustrate a method of identifying the means of movement by the identification unit 30. The user carrying the communication terminal 22 moves from the home 14 to the station 18 nearest the home by walking, waits for a train at the station 18 nearest the home, rides the train from the station 18 nearest the home to the station 20 nearest the place of work, and moves from the station 20 nearest the work of place to the place of work 16 by walking. Given this movement of the user, the home 14 is extracted as the start point, and the place of work 16 is extracted as the end point in the embodiment.

The identification unit 30 identifies a position between the start point and the end point where the communication terminal 22 temporarily stops. When it is determined that the communication terminal 22 stays for two minutes or longer within a range of several meters by referring to the positional information, the identification unit 30 determines the point as a temporary stop point of the communication terminal 22. This makes it possible to identify a situation where the user carrying the communication terminal 22 stops temporarily at a signal or a situation where the train or the bus that the user is riding temporarily stops at a station or a signal.

As shown in FIG. 3, the user carrying the communication terminal 22 starts the home 14 by walking, stops at a temporary stop point P1 and a temporary stop point P2 to wait at a signal, waits for the train at a temporary stop point P3, and stops at a temporary stop point P4 and a temporary stop point P5 that are train stops. The identification unit 30 identifies these points where the user stops temporarily as temporary stop points.

The identification unit 30 divides the route between the start point and the end point by temporary stop points. For example, the identification unit 30 divides the route into a segment between the home 14 (the start point) and the temporary stop point P1, a segment between the temporary stop point P1 and the temporary stop point P2, a segment between the temporary stop point P2 and the temporary stop point P3, etc. When the moving speed of the communication terminal 22 exceeds 20 kilometers per hour at least once between a segment bounded by the start point, the temporary stop point, or the end point, the identification unit 30 identifies the means of movement in that segment to be transportation. When the speed is always equal to or less than 20 kilometers per hour in a segment where the communication terminal 22 stops temporarily, the identification unit 30 identifies the means of movement in that segment to be walking.

Thus, by causing the identification unit 30 to divide the route between the start point and the end point and identify the means of movement for each segment, the means of movement of the communication terminal 22 can be identified precisely. The route between the start point and the end point may be divided by the distance instead of the temporary stop point. For example, the identification unit 30 may divide the route between the start point and the end point into segments of 100 meters each and identify the means of movement for each segment. In other words, the identification unit 30 may define movement means determination points in the route between the start point and the end point, divide the route into a plurality of segments according to the movement means determination points, and identify the means of movement for each segment.

Reference is made back to FIG. 2. In addition to the moving speed of the communication terminal 22, the identification unit 30 may use map information and the positional information on the communication terminal 22 to identify the means of movement. In other words, the identification unit 30 identifies the means of movement based on the moving speed and positional information of the communication terminal 22 and on the map information. For example, the identification unit 30 may identify that the means of movement is transportation when the communication terminal 22 is moving on a rail track or moving on a highway.

The masking unit 32 masks a segment of the route information on the communication terminal 22 including the start point (point of departure) and a segment including the end point (point of arrival) to generate output route information on the communication terminal 22. In other words, the masking unit 32 cuts the segments at the respective ends of the route information including the start point and the end point to generate output route information in which it is made difficult to identify personal information from the route information. The masking unit 32 causes a memory (not shown) to store the output route information.

The segments to mask the start point and the end point may be defined based on the traveling time of the communication terminal 22 or defined based on the traveling distance of the communication terminal 22. The masking unit 32 may define a masked segment based only on one of the traveling time and the traveling distance of the communication terminal 22. Alternatively, the traveling time or the traveling distance of the communication terminal 22 may be selected according to the situation to define the masked segment.

The masking unit 32 defines a segment in which the route information is masked in accordance with the type of the means of movement of the communication terminal 22. The longer the masked segment, the more difficult it is to identify an individual but the lower the usefulness of the data may be. By defining the masked segment in accordance with the type of the means of movement, the usefulness is inhibited from being lowered while at the same time the difficulty of identifying an individual is secured.

When the means of movement of the communication terminal 22 is identified to be transportation, the masking unit 32 defines the distance of the communication terminal 22 masked to be longer than when the means of movement is identified to be walking. For example, when the means of movement of the communication terminal 22 is walking, the masking unit 32 defines the masked segment to be as long as 500 meters. When the means of movement is transportation, the masking unit 32 defines the masked segment to be as long as 1500 meters. When the means of movement is walking, the user often moves a distance shorter than in the case of transportation. When the masked distance is too long, the usefulness of the data may be lowered. By defining the masked segment to be of an appropriate distance shorter than that of transportation, the anonymity is secured while at the same time the usefulness of the data is ensured. When the means of movement is transportation, the traveling distance is often long. The usefulness of the data is ensured, and the anonymity is enhanced even if the masked distance is configured to be long.

When the means of movement of the communication terminal 22 is identified to be walking, the masking unit 32 defines the traveling time of the communication terminal 22 masked to be longer than when the means of movement is identified to be transportation. For example, when the means of movement of the communication terminal 22 is walking, the masking unit 32 defines the masked segment to be as long as ten minutes. When the means of movement is transportation, the masking unit 32 defines the masked segment to be as long as five minutes. When the means of movement is transportation, the user moves a longer distance in a shorter period of time than in the case of walking. When the masked time is too long, therefore, the usefulness of the data may be lowered. By defining an appropriate period of time shorter than that of walking, the usefulness of the data is enhanced.

The masking unit 32 may select whether to define the masked segment in accordance with a traveling distance or in accordance with a traveling time depending on the situation of movement or means of movement of the communication terminal 22. For example, when the moving speed of the communication terminal 22 in a masked segment is extremely low or extremely high, the masking unit 32 may define the masked segment in accordance with a traveling distance. When the communication terminal 22 moves at a smooth speed, the masking unit 32 may define the masked segment in accordance with a traveling time.

The output unit 34 groups the output route information generated by the masking unit 32 according to the user attribute, area, date and time, etc. and outputs the grouped information. The output route information is used as big data in applications like traffic analysis, sightseeing trend analysis, etc.

Figure 4A:
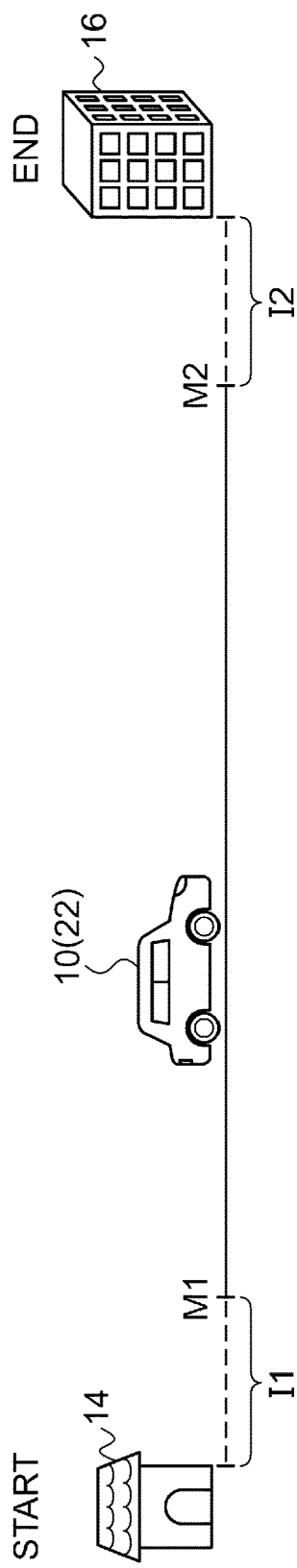
FIGS. 4A and 4B are diagrams to illustrate a mode of masking the start point and the end point of the route information according to a traveling distance.
Figure 4B:
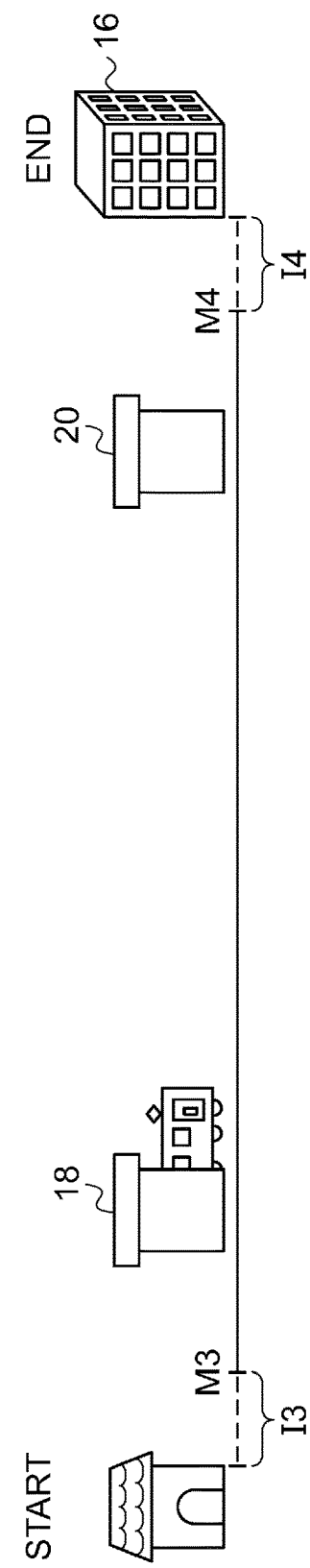

FIGS. 4A and 4B are diagrams to illustrate a mode of masking the start point and the end point of the route information according to a traveling distance. FIG. 4A shows a case where the means of movement in the masked segment is transportation, and FIG. 4B shows a case where the means of movement in the masked segment is walking.

FIG. 4A shows that the user carrying the communication terminal 22 moves from the home 14 to the place of work in the vehicle 10. The figure shows that the home 14 is the start point of the route information, and the place of work 16 is the end point of the route information. Since the means of movement in the segment including the start point and the segment including the end point is transportation, the masking unit 32 defines a first masked segment I1 including the home 14 and a second masked segment I2 including the place of work 16 to be a traveling distance of 1500 meters. The masking unit 32 deletes the first masked segment I1 and the second masked segment I2 from the route information and outputs the route information between an end M1 of the first masked segment I1 and an end M2 of the second masked segment as the output route information.

FIG. 4B shows that the user carrying the communication terminal 22 moves from the home 14 to the station 18 nearest the home by walking, moves from the station 18 nearest the home to the station 20 nearest the place of work on a train, and moves from the station 20 nearest the station 20 to the place of work 16 by walking. Since the means of movement in the segment including the start point and the segment including the end point is walking, the masking unit 32 defines a third masked segment I3 including the home 14 and a third masked segment I4 including the place of work 16 to be a traveling distance of 500 meters. The masking unit 32 deletes the third masked segment I3 and the fourth masked segment I4 from the route information and outputs the route information between an end M3 of the third masked segment I3 and an end M4 of the fourth masked segment as the output route information.

In this way, by defining the masked distance in accordance with the means of movement of the communication terminal 22, the usefulness of the output route information is inhibited from being lowered while at the same time securing the difficulty of identifying an individual from the output route information. Further, when the means of movement is transportation, the anonymity is enhanced by causing the masking unit 32 to define a longer distance. When the means of movement is walking, the usefulness of the data is enhanced by causing the masking unit 32 to define a shorter distance.

Figure 5A:
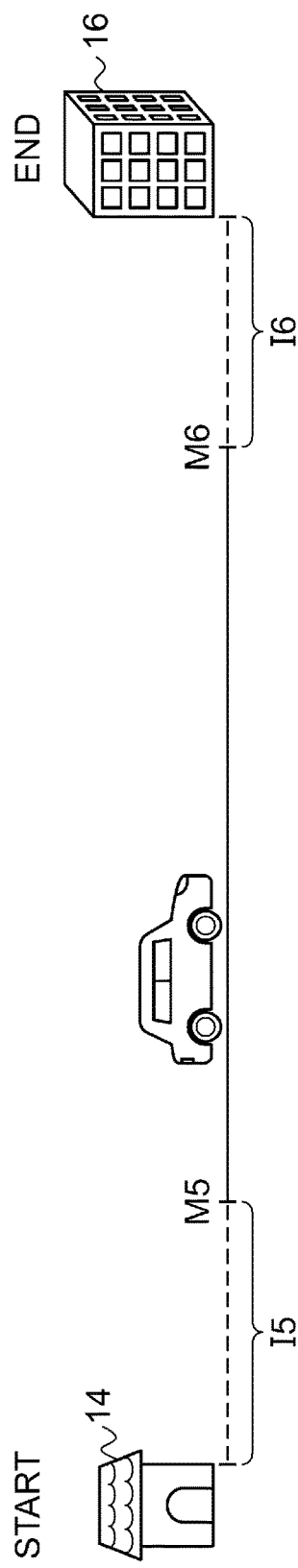
FIGS. 5A and 5B are diagrams to illustrate a mode of masking the start point and the end point of the route information according to a traveling time.
Figure 5B:
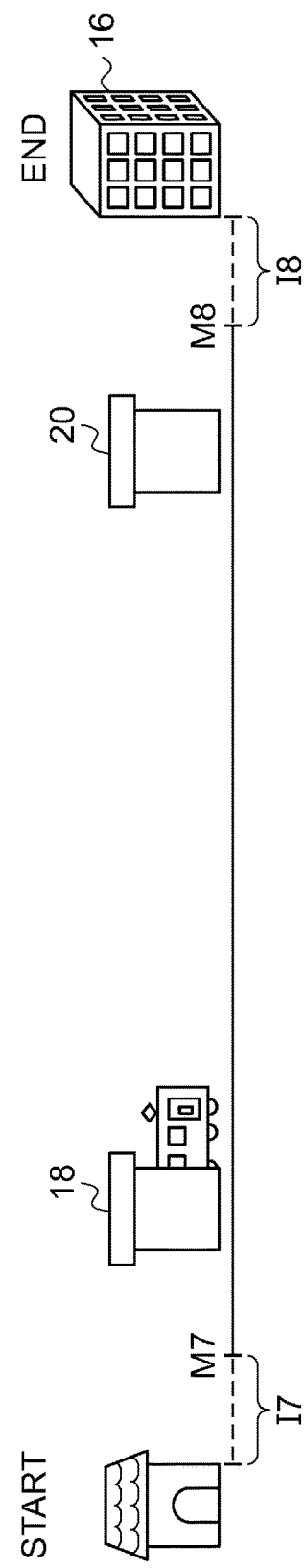

FIGS. 5A and 5B are diagrams to illustrate a mode of masking the start point and the end point of the route information according to a traveling time. FIG. 5A shows a case where the means of movement in the masked segment is transportation, and FIG. 5B shows a case where the means of movement in the masked segment is walking.

FIG. 5A shows that the user carrying the communication terminal 22 moves from the home 14 to the place of work in the vehicle 10. Since the means of movement in the segment including the start point and the segment including the end point is transportation, the masking unit 32 defines a fifth masked segment I5 including the home 14 and a sixth masked segment I6 including the place of work 16 to be a traveling time of five minutes and generates route information between an end M5 of the fifth masked segment I5 and an end M6 of the sixth masked segment as the output route information.

FIG. 5B shows that the user carrying the communication terminal 22 moves from the home 14 to the station 18 nearest the home by walking, moves from the station 18 nearest the home to the station 20 nearest the place of work on a train, and moves from the station 20 nearest the station 20 to the place of work 16 by walking. Since the means of movement in the segment including the start point and the segment including the end point is walking, the masking unit 32 defines a seventh masked segment I7 including the home 14 and an eighth masked segment I8 including the place of work 16 to be a traveling time of ten minutes and generates route information between an end M7 of the seventh masked segment I7 and an end M8 of the eighth segment I8 as the output route information.

When the means of movement is transportation, the user moves a longer distance in a shorter period of time in the case of walking. When the masked time is too long, therefore, the usefulness of the data may be lowered. By defining a shorter period of time than that of walking, the usefulness of the data is enhanced.

Figure 6:
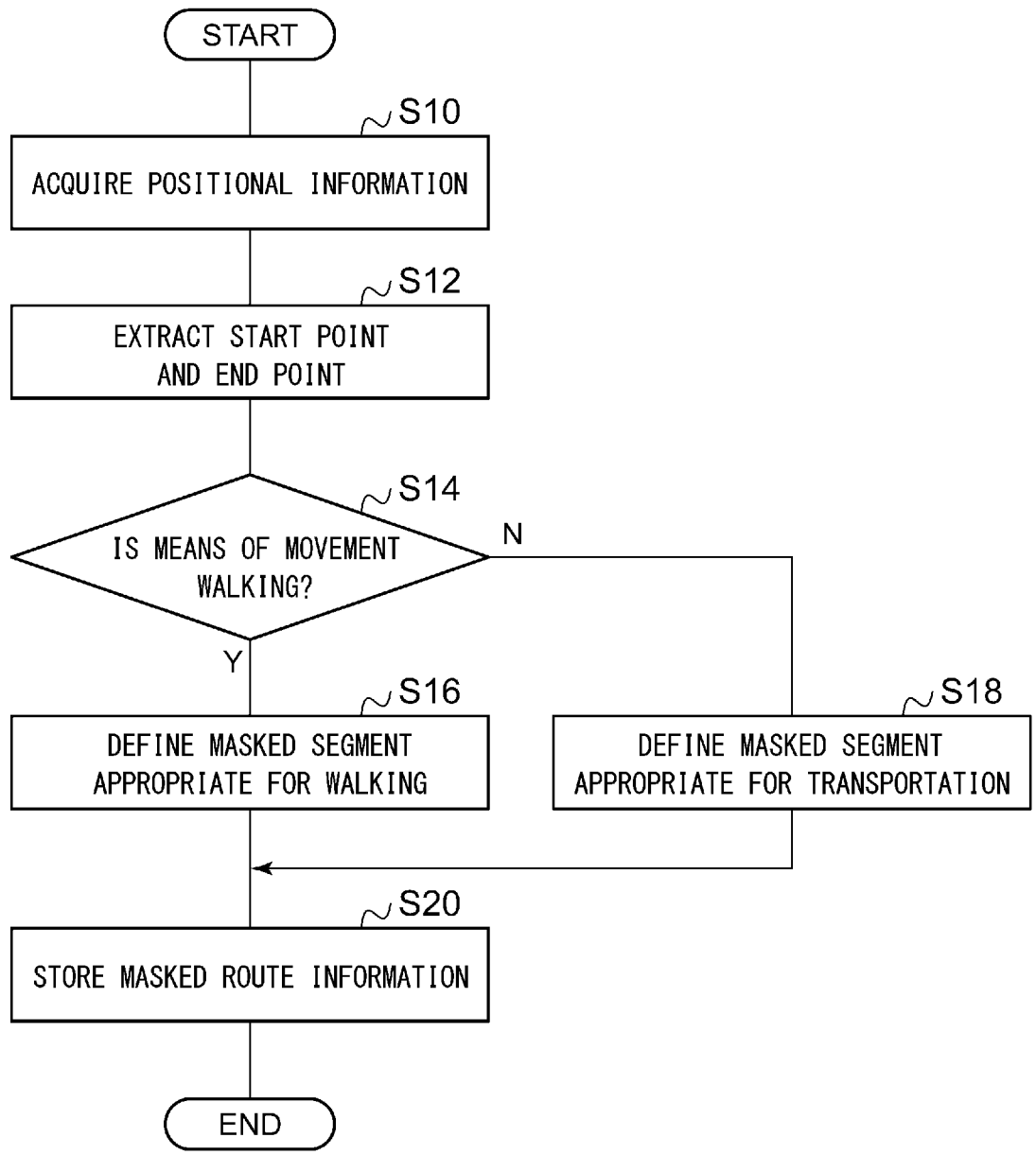
FIG. 6 is a flowchart to illustrate the process of defining a masked segment in the route information.

FIG. 6 is a flowchart to illustrate the process of defining a masked segment in the route information. The acquisition unit 26 acquires positional information and time information from the communication terminal 22 (S10). The extraction unit 28 extracts a point where the communication terminal 22 stays as the start point or the end point of the route information (S12).

The identification unit 30 identifies whether the type of the means of movement of the user carrying the communication terminal 22 is transportation or walking. The masking unit 32 determines whether the means of movement is walking based on a result of identification (S14). When the means of movement is walking (Y in S14), the masking unit 32 defines masked segments of a length appropriate for walking as segments including the start point and the end point of the route information, respectively (S16). Further, when the means of movement is transportation (N in S14), the masking unit 32 defines masked segments of a length appropriate for transportation as segments respectively including the start point and the end point of the route information (S18).

The masking unit 32 generates output route information derived from deleting the masked segments from the route information and causes the memory to store the generated output route information (S20). Thus, by defining masked segments depending on the type of the means of movement, the masking unit 32 can generate output route information in which the usefulness of the data is inhibited from being lowered while at the same time the difficulty of identifying an individual is secured.

Figure 7A:
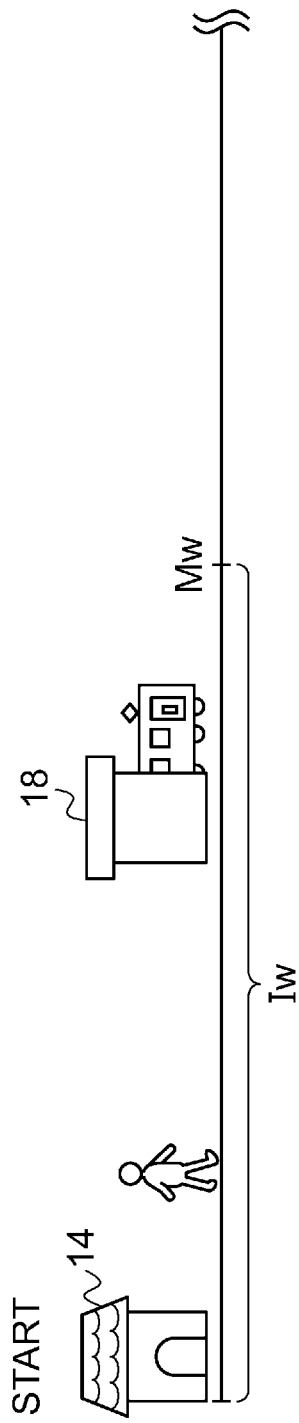
FIGS. 7A and 7B are drawings to illustrate how masked segments are defined when the means of movement is changed in a masked segment.
Figure 7B:
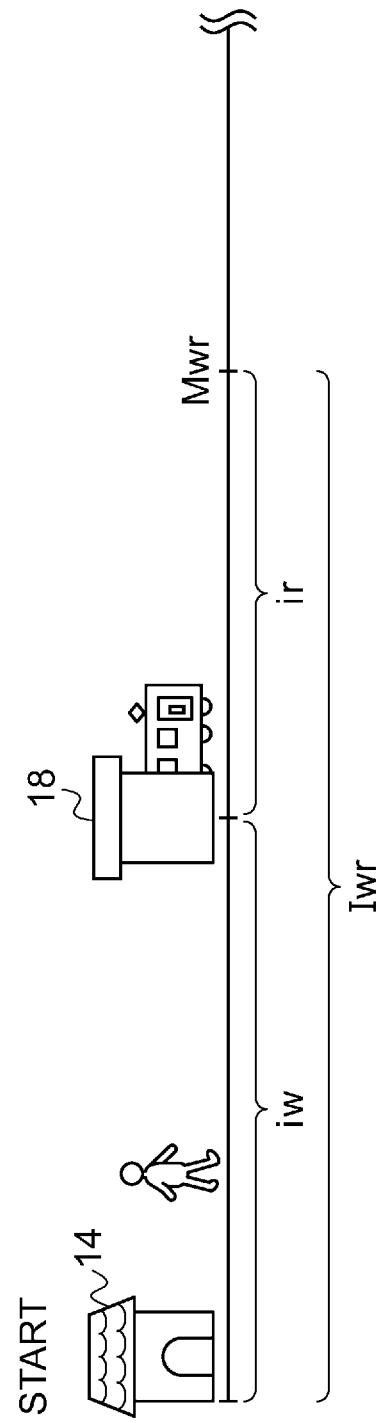

FIGS. 7A and 7B are drawings to illustrate how masked segments are defined when the means of movement is changed in a masked segment. FIGS. 7A and 7B show route information showing that the user of the communication terminal 22 moves from the home 14 to the station 18 nearest the home by walking and moves from the station 18 nearest the home on a train.

As shown in FIG. 7B, when the means of movement is changed in a masked segment, the masking unit 32 masks the totality of segments defined in accordance with the type of the means of movement. In the event that the means of movement is changed in a masked segment, a balance is established between the usefulness of the data and the anonymity by deriving masked segments individually in accordance with the means of movement and masking the totality of the derived segments.

More specifically, as shown in FIG. 7A, the masking unit 32 defines a first masked segment Iw appropriate for walking based on the means of movement from the home 14, the start point. The masking unit 32 determines whether the means of movement is changed in the first masked segment Iw. In other words, the masking unit 32 determines whether the means of movement is changed from the first means of movement to the second means of movement in the second masked segment, which is shorter than the first masked segment masked when the only means of movement is the first means of movement.

Since the means of movement is changed at the station 18 nearest the home in the first masked segment Iw, the masking unit calculates a second masked segment iw between the home 14 and the station 18 nearest the home at a rate appropriate for walking. The masking unit 32 converts the difference between the first masked segment Iw and the second masked segment iw to adapt to transportation as the means of movement, thereby calculating a third masked segment ir. The masking unit 32 totals the second masked segment iw and the third masked segment ir to define a masked segment Iwr. In other words, the masking unit 32 converts the difference between the first masked segment and the second masked segment in accordance with the second means of movement to define the third masked segment and masks the totality of the second masked segment and the third masked segment.

This allows segments appropriate for the means of movement to be defined properly when the means of movement is changed in a masked segment and establishes a balance between the usefulness of the data and the anonymity.

The masking unit 32 may calculate the third masked segment based on a conversion rate appropriate for the means of movement. For example, the masking unit 32 may calculate the third masked segment it by multiplying the difference between the first masked segment Iw and the second masked segment iw by a conversion rate appropriate for transportation.

That the means of movement is changed is detected by the identification unit 30. The identification unit 30 identifies the means of movement based on the change of the position of the communication terminal in a segment including the start point or the end point and identifies whether the means of movement is changed in a predetermined range in the segment including the start point or the end point. The masking unit 32 derives the first masked segment appropriate for the means of movement in the segment including the start point or the end point and masks the totality of segments defined in accordance with the type of the means of movement in the event that the means of movement is changed in the first masked segment thus derived.

The definition of masked segments toward the start point is described with reference to FIGS. 7A and 7B but masked segments toward the end point are similarly defined. More specifically, the masking unit 32 calculates the first masked segment based on the means of movement in the segment including the end point. When the means of movement is changed in the first masked segment, the masking unit 32 calculates the difference between the first masked segment and the second masked segment between the end point and the position where the means of movement is changed. The masking unit 32 converts the difference to adapt to the means of movement to define the third masked segment and totals the second masked segment and the third masked segment to define masked segments toward the end point.

The masking unit 32 may define a masked segment by defining a traveling time of the communication terminal 22. The masking unit 32 may configure the time defined in the masked segment when the means of movement in the masked segment includes walking and transportation to be shorter than the time defined in the masked segment when the only means of movement in the masked segment is walking.

The masking unit 32 may define a masked segment by defining a traveling distance of the communication terminal 22. The masking unit 32 may configure the distance defined in the masked segment when the means of movement in the masked segment includes walking and transportation to be longer than the distance defined in the masked segment when the only means of movement in the masked segment is walking.

Figure 8:
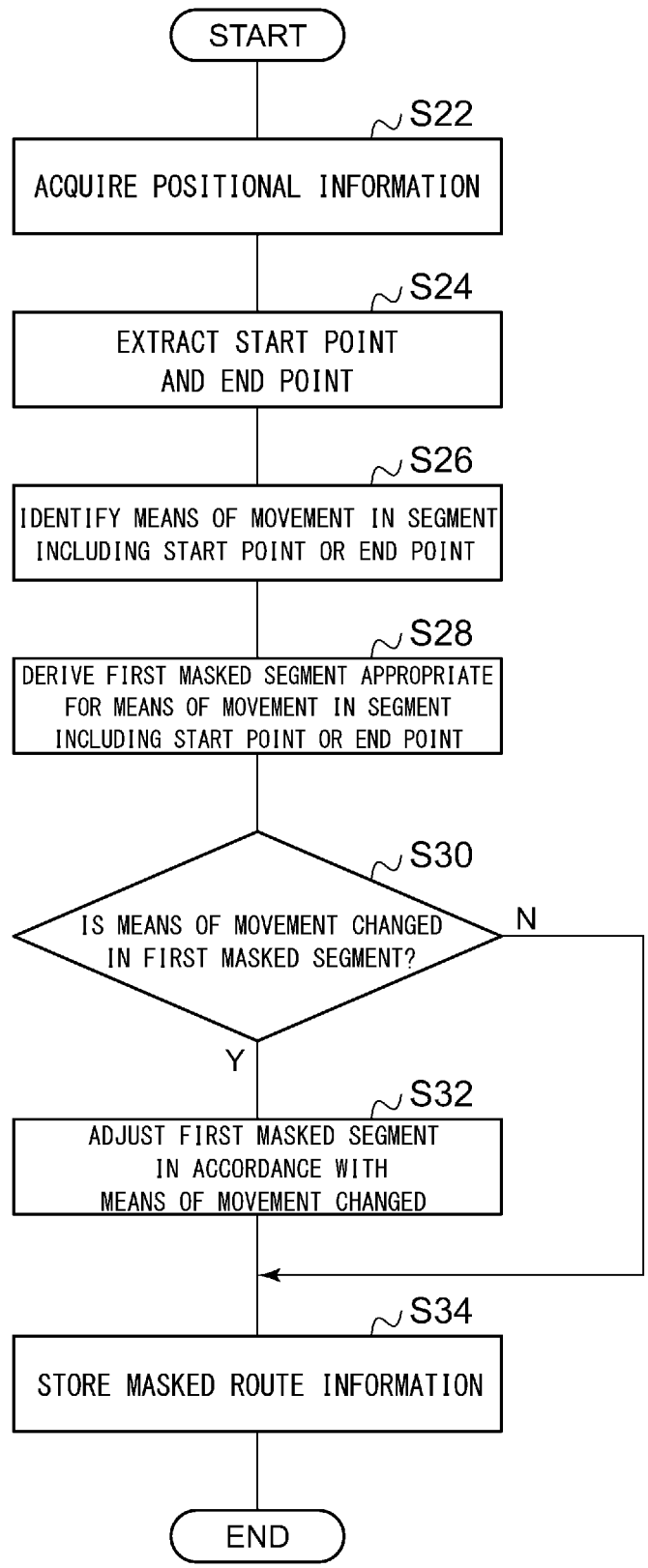
FIG. 8 is a flowchart to illustrate the process of masking route information when the means of movement is changed in a masked segment.

FIG. 8 is a flowchart to illustrate the process of masking route information when the means of movement is changed in a masked segment. The acquisition unit 26 acquires positional information and time information from the communication terminal 22 (S22). The extraction unit 28 extracts a point where the communication terminal 22 stays as the start point or the end point of the route information (S24).

The identification unit 30 identifies whether the type of the means of movement to arrive at the start point or the end point is transportation or walking and identifies whether the means of movement to arrive at the start point or the end point is changed (S26). The masking unit 32 derives the first masked segment based on the means of movement to arrive at the start point or the end point (S28).

The masking unit 32 determines whether the means of movement is changed in the first masked segment (S30). When the means of movement is not changed in the first masked segment (N in S30), the masking unit 32 maintains the first masked segment to mask the route information. The masking unit 32 causes the memory to store the generated output route information (S34) and terminates the process.

When the means of movement is changed in the first masked segment (Y in S30), the masking unit 32 adjusts the first masked segment in accordance with the means of movement changed (S32). More specifically, the masking unit 32 derives a segment from the start point or the end point to a position where the means of movement is changed in the first masked segment as a second masked segment. The masking unit 32 converts the difference between the first masked segment and the second masked segment in accordance with the means of movement changed so as to define third masked segment and masks the totality of the second masked segment and the third masked segment.

The masking unit 32 causes the memory to store the output route information (S34) generated in the masking process and terminates the process. By deriving partial masked segments individually in accordance with the type of the means of movement and totaling the derived segments, the masked segments can be defined properly and a balance between the usefulness of the data and anonymity can be established.

The embodiment is intended to be illustrative only and it will be understood by those skilled in the art that various modifications to constituting elements could be developed and that such modifications are also within the scope of the present invention.

What is claimed is:

1. A server device comprising:
an acquisition unit configured to acquire positional information on a communication terminal;
an extraction unit configured to extract route information including a start point and an end point from the positional information;
an identification unit configured to identify a way the communication terminal is moved based on the positional information; and
a masking unit configured to mask a segment of the route information including the start point and a segment including the end point to generate output route information, wherein
the masking unit defines a masked segment of the route information in accordance with the way the communication terminal is moved, wherein
the identification unit identifies a temporary stop point between the start point and the end point where the communication terminal stops temporarily and identifies the way the communication terminal is moved for each of segments derived from dividing a route between the start point and the end point by the temporary stop point.

2. A server device comprising:
an acquisition unit configured to acquire positional information on a communication terminal;
an extraction unit configured to extract route information including a start point and an end point from the positional information;
an identification unit configured to identify a way the communication terminal is moved based on the positional information; and
a masking unit configured to mask a segment of the route information including the start point and a segment including the end point to generate output route information, wherein
the masking unit defines a masked segment of the route information in accordance with the way the communication terminal is moved, wherein
the identification unit identifies whether the way of movement of the communication terminal is walking or transportation, and
the masking unit defines a masked segment of the route information by defining a traveling time of the communication terminal and configures the traveling time of the communication terminal masked when the way of movement is identified to be walking to be longer than the traveling time of the communication terminal masked when the way of movement is identified to be transportation.

3. A server device comprising:
an acquisition unit configured to acquire positional information on a communication terminal;
an extraction unit configured to extract route information including a start point and an end point from the positional information;
an identification unit configured to identify a way the communication terminal is moved based on the positional information; and
a masking unit configured to mask a segment of the route information including the start point and a segment including the end point to generate output route information, wherein
the masking unit defines a masked segment of the route information in accordance with the way the communication terminal is moved, wherein
the identification unit identifies whether the way of movement of the communication terminal is walking or transportation, and the masking unit defines a masked segment of the route information by defining a traveling distance of the communication terminal and configures the traveling distance of the communication terminal masked when the way of movement is identified to be transportation to be longer than the traveling distance of the communication terminal masked when the way of movement is identified to be walking.

4. A server device comprising:

an acquisition unit configured to acquire positional information on a communication terminal;

an extraction unit configured to extract route information including a start point and an end point from the positional information;

an identification unit configured to identify a way the communication terminal is moved based on the positional information; and a masking unit configured to mask a segment of the route information including the start point and a segment including the end point to generate output route information, wherein the masking unit defines a masked segment of the route information in accordance with the way the communication terminal is moved, wherein when the way of movement is changed from a first way of movement to a second way of movement in a second masked segment, which is shorter than a first masked segment masked when the only way of movement is the first way of movement, the masking unit converts a difference between the first segment and the second segment in accordance with the second way of movement to define a third segment and masks a totality of the second segment and the third segment.

* * * * *